(12) United States Patent
Berlin et al.

(10) Patent No.: US 10,299,151 B1
(45) Date of Patent: May 21, 2019

(54) APPLICATION MODULES (AMS) WITH MULTI-CARRIER SUBSCRIBER IDENTITY MODULES (MSIMS) FOR DIAGNOSTIC MODE MONITORING OF SIGNALS WITHIN WIRELESS DISTRIBUTED COMMUNICATIONS SYSTEMS

(71) Applicant: Corning Research & Development Corporation, Corning, NY (US)

(72) Inventors: Igor Berlin, Potomac, MD (US); Aravind Chamarti, Ashburn, VA (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/807,773

(22) Filed: Nov. 9, 2017

(51) Int. Cl.
| | | |
|---|---|---|
| *H04W 24/08* | (2009.01) | |
| *H04W 4/50* | (2018.01) | |
| *H04W 88/08* | (2009.01) | |
| *H04W 88/06* | (2009.01) | |

(52) U.S. Cl.
CPC ............ *H04W 24/08* (2013.01); *H04W 4/50* (2018.02); *H04W 88/06* (2013.01); *H04W 88/085* (2013.01)

(58) Field of Classification Search
CPC ..... H04W 24/08; H04M 15/774; G01D 4/002
See application file for complete search history.

(56) References Cited

U.S. PATENT DOCUMENTS

| | | | |
|---|---|---|---|
| 8,909,224 B2 | 12/2014 | Haynes et al. | |
| 9,351,236 B2 | 5/2016 | Fan et al. | |
| 2011/0117965 A1* | 5/2011 | Gong | H04W 48/18 455/558 |
| 2016/0007190 A1* | 1/2016 | Wane | H04W 4/50 455/419 |
| 2016/0014280 A1* | 1/2016 | Brunsman | H04M 15/774 455/407 |
| 2016/0094985 A1* | 3/2016 | Chong | H04W 8/205 455/558 |
| 2016/0370204 A1* | 12/2016 | Spanier | G01D 4/002 |
| 2017/0005680 A1* | 1/2017 | Lokasaari | H04B 1/3816 |
| 2017/0081141 A1 | 3/2017 | Fernandez et al. | |

FOREIGN PATENT DOCUMENTS

WO   2015180779 A1   12/2015

* cited by examiner

*Primary Examiner* — Myron Wyche
(74) *Attorney, Agent, or Firm* — C. Keith Montgomery

(57) ABSTRACT

Application modules (AMs) with multi-carrier subscriber identity modules (MSIMs) for diagnostic mode monitoring of signals within wireless distributed communications systems (WDCSs), including but not limited to distributed antenna systems (DASs). Related systems and methods are also disclosed. The MSIMs comprise circuitry configured to implement multiple SIM instances, each SIM instance containing carrier-specific data to enable the AM to register with a carrier to perform diagnostic mode monitoring of signals from the respective carrier. In one embodiment, AMs may be associated with components of a WDCS. By associating the AMs into components of a WDCS, live signals in the WDCS can be monitored and measured for monitoring the performance of components within the WDCS. The AMs may include one or more application level applications configured to receive and monitor signals in the WDCS, and to provide application-level information about such monitored signals to other components or systems, or technicians.

23 Claims, 13 Drawing Sheets

APPLICATION MODULES (AMS) WITH MULTI-CARRIER SUBSCRIBER IDENTITY MODULES (MSIMS) FOR DIAGNOSTIC MODE MONITORING OF SIGNALS WITHIN WIRELESS DISTRIBUTED COMMUNICATIONS SYSTEMS

RELATED APPLICATION

The present application is related to International Patent Application Serial No. PCT/US15/32397, filed on May 26, 2015, entitled "Multiple Application Modules (MAMs) For Monitoring Signals In Components In Wireless Distribution Systems, Including Distributed Antenna Systems (DASs), And Related Systems And Methods," which is incorporated herein by reference in its entirety.

BACKGROUND

The technology of the present disclosure relates generally to application modules for monitoring of signals in components of wireless distributed communications systems (WDCSs), including distributed antenna systems (DASs).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). WDCSs communicate with wireless devices called "clients," "client devices," or "wireless client devices," which reside within the wireless range or "cell coverage area" in order to communicate with an access point device. One example of a WDCS is a DAS. DASs are particularly useful to be deployed inside buildings or other indoor environments where client devices may not otherwise be able to effectively receive radio frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas, also referred to as "antenna coverage areas." Antenna coverage areas can be formed by remotely distributed remote antenna units (RAUs), which may also be referred to as remote units (RUs). The remote units each contain or are configured to couple to one or more antennas configured to support the desired frequency(ies) or polarization(s) to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

FIG. 1 illustrates an example of distribution of communications services in a WDCS. FIG. 1 illustrates distribution of communications services to coverage areas 10(1)-10(N) of a DAS 12, wherein 'N' is the number of coverage areas. These communications services can include cellular services, wireless services such as RFID tracking, WiFi, LAN, WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller (HEC) or head-end unit (HEU)). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

In the DAS 12 in FIG. 1, after installation and commissioning, a site walk is typically performed to analyze the data quality for optimization of the coverage areas 10(1)-10(N) created by the remote antenna units 14(1)-14(N). The site walk may involve activating the DAS 12 for the central unit 16 to receive the downlink communications signals 20D from the base station 18 for distribution to the remote antenna units 14(1)-14(N). Then, a service technician walks around the different coverage areas 10(1)-10(N) with a wireless communication device, such as a mobile phone or laptop computer, which may be referred to generally as a user equipment (UE), to receive the distributed downlink communications signals 20D from the remote antenna units 14(1)-14(N). The received downlink communications signals 20D can be reviewed and analyzed by personnel conducting the site walk to determine the quality of the coverage areas 10(1)-10(N), such as signal strength as an example. The DAS 12 may also be configured to generate alarms indicative of signal quality. Any quality issues in the DAS 12 can be identified and resolved. However, the context of the received downlink communications signals 20D is not known. For example, it is not known which received downlink communications signals 20D and/or how many communications bands are being distributed in the DAS 12.

An additional difficulty faced during a site walk is that the DAS 12 may operate to distribute signals for more than one carrier simultaneously. The conventional way of calibrating/diagnosing cellular signals in this scenario is to perform site walks with multiple UEs, where each UE is connected to a different carrier, and over-the-air scanners; after the site walk there is no on-site diagnostic equipment left on site for continuous monitoring of the on-going service signal changes. In order for the service technician's client device 26 to operate in a diagnostic mode, in which the client device 26 registers with the carrier network in order to get more detailed information, such as higher open systems interconnect (OSI) layer information, about the network signals, that client device 26 must have a carrier-specific subscriber identity module (SIM) card. A SIM card is not required by the client device 26 to operate in a scanning mode, during which the client device 26 does not register with a carrier but instead camps temporarily and can collect signal identification parameters and signal levels. However, having a SIM card allows the service technician's client device 26 to collect valuable information not available in scanning mode. As a result, a service technician performing a site walk in a DAS 12 that supports multiple carriers must possess multiple client devices 26, one client device 26 for every carrier being supported within the DAS 12. Some cellular providers/OEM vendors now offer stand-alone equipment that consists of multiple UEs to monitor different signal types. Such equipment is located at known location such as different zones in a stadium to continuously monitor the quality of service (QoS) or quality of experience (QoE) of the cellular signals. However, such equipment merely contains multiple, separate UEs to monitor different service providers, each UE containing a carrier-specific SIM. Installation, maintenance, and operation of these units are cost prohibitive in nature due to the cumbersome hardware and maintenance of the multiple SIMs.

No admission is made that any reference cited herein constitutes prior art. Applicant expressly reserves the right to challenge the accuracy and pertinency of any cited documents.

SUMMARY

Embodiments disclosed herein include application modules (AMs) with multi-carrier subscriber identity modules (MSIMs) for diagnostic mode monitoring of signals within wireless distributed communications systems (WDCSs), including but not limited to distributed antenna systems (DASs). Related systems and methods are also disclosed. The MSIMs comprise circuity configured to implement multiple SIM instances, each SIM instance containing carrier-specific data to enable the AM register with a carrier to perform diagnostic mode monitoring of signals from the respective carrier. In one embodiment, AMs may be associated with components of a WDCS. These AMs include wireless telecommunication circuitry associated with wireless distribution components in a WDCS, such as communications and power components as examples. By associating the AMs with one or more components of a WDCS, live signals in the WDCS can be monitored and measured for monitoring the performance of components within the WDCS. The AMs include a multiple application software platform architecture that includes one or more application layer applications configured to receive and monitor signals in the WDCS, and to provide application-level information about such monitored signals to other components or systems, or technicians. The application-level information can be used by a technician or other system to diagnose or calibrate the WDCS and/or the communications components provided therein. Each AM can be configured to engage in diagnostic mode monitoring of signals associated with each of one or more carriers.

One embodiment of the disclosure relates to an AM for multi-carrier, diagnostic mode monitoring of signals within a WDCS. The AM comprises a multi-carrier subscriber identity module (MSIM) comprising circuity configured to implement a plurality of SIM instances, each SIM instance containing carrier-specific data to enable the AM to register with a carrier to perform diagnostic mode monitoring of signals from the respective carrier. The AM further comprises at least one communications interface configured to receive communications signals from a plurality of sectors in a WDCS, the communications signals comprising at least one of a downlink communications signal and an uplink communications signal. The AM further comprises at least one processor configured to execute at least one application layer application to analyze the at least one of the downlink communications signal and the uplink communications signal. The AM is configured to communicate application-level information regarding the analyzed at least one of the downlink communications signal and the uplink communications signal to another system.

Another embodiment of the disclosure relates to a WDCS. The WDCS comprises a central unit configured to receive a downlink communications signal from a communications system, distribute the downlink communications signal over at least one downlink communications medium to a plurality of remote units, receive an uplink communications signal from the plurality of remote units over at least one uplink communications medium, and distribute the uplink communications signal to the communications system. Each remote unit among the plurality of remote units is configured to receive the downlink communications signal from the central unit over the at least one downlink communications medium, distribute the downlink communications signal to a client device, receive the uplink communications signal from the client device, and distribute the uplink communications signal to the central unit over the at least one uplink communications medium. The WDCS also includes at least one AM associated with at least one of the central unit and at least one of the remote units among the plurality of remote units. The at least one AM comprises at least one communications interface configured to receive communications signals from a plurality of sectors in the WDCS, the communications signals comprising at least one of the downlink communications signal and the uplink communications signal. The at least one AM further comprises at least one processor configured to execute at least one application layer application to analyze the at least one of the downlink communications signal and the uplink communications signal. The at least one AM further comprises an MSIM configured to implement a plurality of SIM instances, each SIM instance containing carrier-specific data to enable the AM to register with a carrier to perform diagnostic mode monitoring of signals from the respective carrier. The at least one AM is configured to receive at least one of the downlink communications signal and the uplink communications signal, and communicate application-level information regarding the analyzed at least one of the downlink communications signal and the uplink communications signal to another system.

Another embodiment of the disclosure relates to a method for an AM for multi-carrier, diagnostic mode monitoring of signals in a WDCS. The method comprises receiving a downlink communications signal from a communications system in a central unit, distributing the downlink communications signal over at least one downlink communications medium to a plurality of remote units, and distributing the received downlink communications signal in each remote unit among the plurality of remote units to a client device. The method further comprises receiving an uplink communications signal from the plurality of remote units over at least one uplink communications medium in the central unit, receiving the uplink communications signal in each remote unit among the plurality of remote units from the client device, and distributing the received uplink communications signal in each remote unit among the plurality of remote units to the central unit. The method further comprises executing at least one application layer application in at least one processor in at least one AM associated with at least one of the central unit and at least one of the remote units among the plurality of remote units to analyze the at least one of the downlink communications signal and the uplink communications signal, the AM comprising an MSIM configured to implement a plurality of SIM instances, each SIM instance containing carrier-specific data to enable the AM to register with a carrier to perform diagnostic mode monitoring of signals from the respective carrier. The method further comprises communicating application-level information regarding the analyzed at least one of the downlink communications signal and the uplink communications signal to another system.

Another embodiment of the disclosure relates to a non-transitory computer-readable medium having stored thereon computer executable instructions to cause a processor-based AM associated with a communications component in a WDCS to receive a downlink communications signal from a communications system in a central unit, distribute the downlink communications signal over at least one downlink communications medium to a plurality of remote units, and distribute the received downlink communications signal in each remote unit among the plurality of remote units to a client device. The computer executable instructions further cause the AM to receive an uplink communications signal from the plurality of remote units over at least one uplink communications medium in the central unit, receive the uplink communications signal in each remote unit among the plurality of remote units from the client device, and distribute the received uplink communications signal in each remote unit among the plurality of remote units to the central unit. The computer executable instructions further cause the AM to execute at least one application layer application in at least one processor in at least one AM associated with at least one of the central unit and at least one of the remote units among the plurality of remote units to analyze the at least one of the downlink communications signal and the uplink communications signal, the AM comprising an MSIM configured to implement a plurality of SIM instances, each SIM instance containing carrier-specific data to enable the AM to register with a carrier to perform diagnostic mode monitoring of signals from the respective carrier. The computer executable instructions further cause the AM to communicate application-level information regarding the analyzed at least one of the downlink communications signal and the uplink communications signal to another system.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain the principles and operation of the various embodiments.

DETAILED DESCRIPTION

Various embodiments will be further clarified by the following examples.

Embodiments disclosed herein include application modules (AMs) with multi-carrier subscriber identity modules (MSIMs) for diagnostic mode monitoring of signals within wireless distributed communications systems (WDCSs), including but not limited to distributed antenna systems (DASs). Related systems and methods are also disclosed. The MSIMs comprise circuitry configured to implement multiple SIM instances, each SIM instance containing carrier-specific data to enable the AM register with a carrier to perform diagnostic mode monitoring of signals from the respective carrier. In one embodiment, AMs may be associated with components of a WDCS. These AMs include wireless telecommunication circuitry associated with wireless distribution components in a WDCS, such as communications and power components as examples. By associating the AMs with one or more components of a WDCS, live signals in the WDCS can be monitored and measured for monitoring the performance of components within the WDCS. The AMs include a multiple application software platform architecture that includes one or more application layer applications configured to receive and monitor signals in the WDCS, and to provide application-level information about such monitored signals to other components or systems, or technicians. The application-level information can be used by a technician or other system to diagnose or calibrate the WDCS and/or the communications components provided therein. Each AM can be configured to engage in diagnostic mode monitoring of signals associated with each of one or more carriers.

The subject matter described herein relates to enabling enhanced spectrum/service signal diagnostics in WDCSs. In particular, it is related to providing multiple subscriber identity module (SIM) instances within a single, specially adapted user equipment (UE) to eliminate the need for multiple UEs to scan and diagnose cellular service signals from different service providers. Such a method when implemented in a WDCS will reduce the redundant hardware needed to diagnose the provisioned cellular service signals while providing intelligence to the system and its environment.

Figure 2:
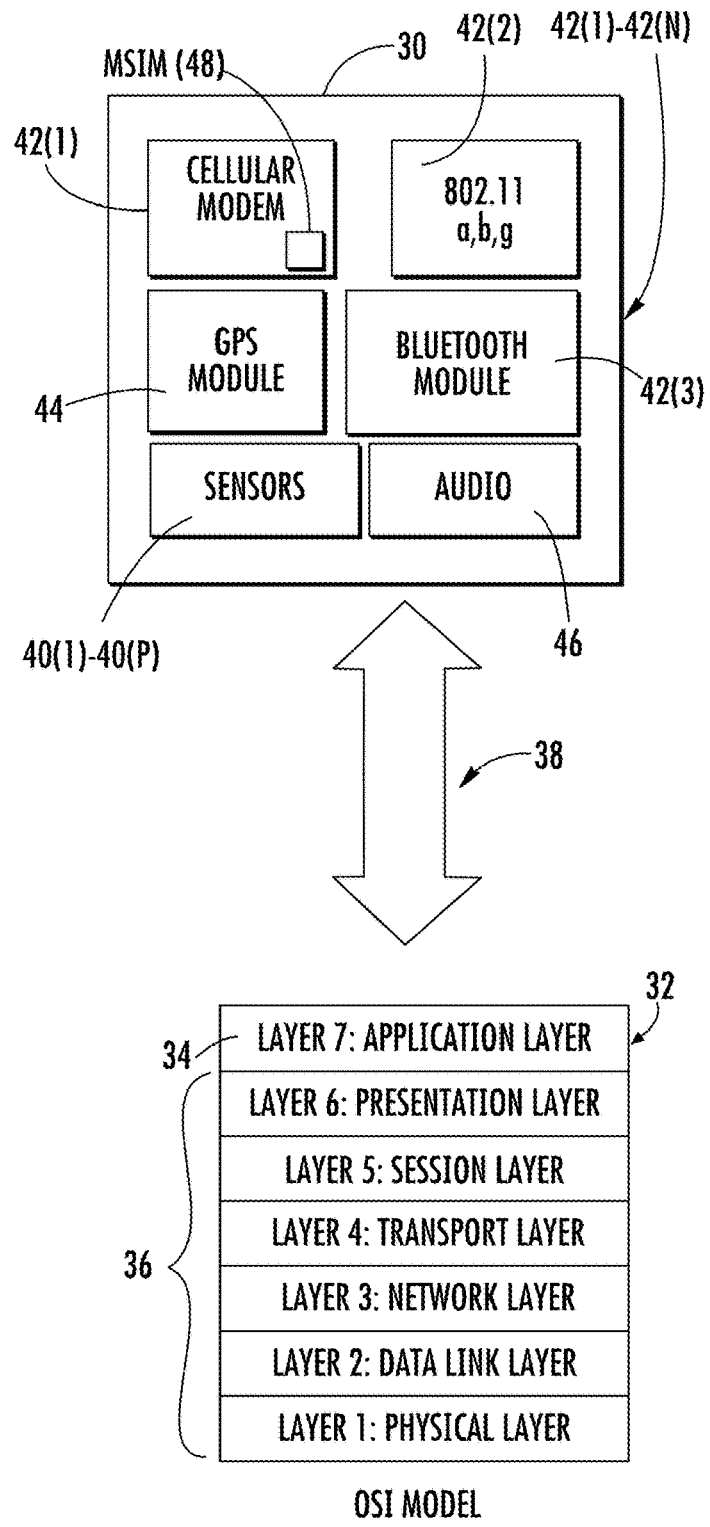
FIG. 2 is a schematic diagram of an exemplary application module (AM) with a multi-carrier subscriber identity module (MSIM) for diagnostic mode monitoring of signals and that can be associated with one or more components of a DAS WDCS to monitor live signals in the WDCS, create application-level information about the monitored signals, and communicate the application-level information to other systems.

In this regard, FIG. 2 is a schematic diagram of an exemplary AM 30 for multi-carrier, diagnostic mode monitoring of signals. As will be discussed in more detail below, the AM 30 can be associated with one or more components of a WDCS as a client device to monitor live signals (e.g., component power, radio frequency (RF) power or communications signals) in the WDCS and create application-level information (e.g., application level data) about the monitored signals. The AM 30 is configured with one or more application layer applications 32, such as provided in an application layer 34 of an OSI model, as a non-limiting example. In this example, the application layer application 32 is configured to retrieve information about monitored signals in a WDCS from lower layers 36 in the AM 30 to generate application-level information 38 about the monitored signals. Context information can be included in the application-level information 38 about the monitored signals for additional information that requires application level processing, as opposed to lower layer signal monitoring that may not include context information.

For example, the AM 30 may include one or more sensors 40(1)-40(P) that can be employed to sense information about monitored signals in a WDCS that is provided to software application layer application 32 (also referred to herein as "application layer application 32") in the application layer 34 of the AM 30 to generate the application-level information 38 about the monitored signals. For example, one of the sensors 40(1)-40(P) may be a power level detector configured to determine a power level (e.g., an RF power level) of a monitored signal, wherein the application-level information 38 relates to power level of the monitored signals. As an example, the application-level information 38 may include a history of power level information for the monitored signal, as opposed to just a physical level power level, for additional context information. Thus, the power level information in the application-level information 38 may be more useful in calibrating gain levels in the WDCS than just one power level about the monitored signal. The application layer application 32 in the AM 30 can then communicate this application-level information 38 through a communications interface to other systems for use in diagnosing and/or calibrating a WDCS. Further, because the application layer applications 32 in the AM 30 may be open architecture applications, customers or technicians may be able to load their own application layer applications 32 in the AM 30, including customized applications, for monitoring signals in their WDCS and providing application-level information 38, and/or forming an application network.

In this regard, with continuing reference to FIG. 2, the AM 30 in this embodiment includes a number of communications interfaces 42(1)-42(N) that can communicate the application-level information 38 to other systems. For example, the communications interfaces 42(1)-42(N) can include a cellular modem 42(1), WiFi interface 42(2), and Bluetooth module 42(3), as shown in FIG. 2. As will be described in more detail below, the AM 30 will be incorporated into a WDCS component as a client device that is capable of receiving communications distributed through the DAS, such as cellular communications signals through the cellular modem 42(1) and WiFi signals through the WiFi interface 42(2). Because the AM 30 appears as a client device in the WDCS, the AM 30 can also transmit communications signals through a communications interface 42 within a WDCS like client devices, or outside the WDCS, to other recipients, including technician or service personnel communications devices to provide the application-level information 38 about monitored signals. The Bluetooth module 42(3) in this example allows for local communications to the AM 30 to retrieve application-level information 38 outside of the WDCS, if desired. Also, because the AM 30 has the functionality of a client device in the WDCS, the AM 30 may also be configured to receive calls or other communications from another system through the WDCS to retrieve the application-level information 38 from the AM 30. In this regard, the application layer applications 32 in the AM 30 may facilitate the AM 30 to initiate providing application-level information 38 to other systems without being requested, such as due to alarm conditions or other criteria or thresholds being exceeded.

The AM 30 may also have other components that are useful in monitoring signals in a WDCS. For example, the AM 30 may include a global positioning module (GPS) 44 that can allow the AM 30 to determine its location and communicate this location in conjunction with application-level information 38. The AM 30 may also include an audio component 46, such as to allow the AM 30 to respond to voice commands or provide application-level information 38 about monitored signals audially, as examples.

Because the AM 30 provides the application layer applications 32 for providing the application-level information 38 about monitored signals, less cost and faster development times may be realized since changes to the application layer applications 32 can be made in software rather than through hardware updates. The AM 30 allows uploads for new application layer applications 32 to be provided in the application layer 34 or updates to existing application layer applications 32 in the application layer 34. Also, by allowing for application layer applications 32 in the AM 30, outsider developers, including individual developers, can develop third party software applications for the AM 30 for further availability to WDCS application layer applications for cost effective development.

With continuing reference to FIG. 2, the AM 30 in this embodiment includes a multi-carrier subscriber identity module (MSIM) 48 that includes circuitry for storing carrier-specific data for each of one or more carriers, thus allowing the AM 30 to perform diagnostic mode monitoring of signals from one or more of the one or more carriers. The MSIM 48 allows the AM 30 to leverage different aspects of SIMs to operate a cellular radio in scanning and diagnostic modes. In one embodiment, the MSIM 48 stores separate sets of carrier-specific data, one set for each of the one or more carriers supported. Examples of carrier-specific data include, but are not limited to, an international mobile subscriber identity (IMSI) number, security authentication and ciphering information, temporary information related to the local network, a list of the services the user has access to, and passwords (e.g., a personal identification number (PIN) for ordinary use, and a personal unblocking code (PUK) for PIN unlocking). In one embodiment, each set of carrier-specific data has its own unique serial number, such as an integrated circuit card identifier (ICCID).

In the embodiment illustrated in FIG. 2, the MSIM 48 is shown as a component within the cellular modem 42(1), but in alternative embodiments, the MSIM 48 may be a component within another module within the AM 30, the MSIM 48 may be a separate module within the AM 30, or the MSIM 48 may be considered a component outside of the AM 30 but coupled to the AM 30 via a communications interface.

In one embodiment, the MSIM 48 may contain one or more instances of conventional SIM circuitry. In these embodiments, the MSIM 48 may be viewed as containing multiple SIM cards, or their circuit equivalents, which are referred to herein as "hardware SIM instances," that are electrically connected to the AM via circuitry that selects or enables a subset (e.g., one or more) of the number of SIM cards at a time.

In another embodiment, the MSIM 48 may contain one or more instances of virtualized SIM cards (vSIMs), which are referred to herein as "virtual SIM instances." Examples of vSIMs include softSIMs, which are fully virtual (i.e., they are software based and do not have hardware), and eSIMs, which reside within non-removable hardware on board a device but which can be provisioned over a network to operate like a SIM card for one particular carrier. In such embodiments, the MSIM 48 may be viewed as containing multiple virtual SIM instances that are under the control of a scheduler or controller that activates a subset (e.g., one or more) of the number of virtualized SIMs at a time.

In yet another embodiment, the MSIM 48 may contain a mix of hardware SIM instances and virtual SIM instances. In such embodiments, the MSIM 48 may enable or activate one of SIM instances (hardware or virtual) at a time.

Thus, whereas conventional SIMs store carrier-specific data for a single carrier, the MSIM 48 is configurable to store multiple sets of carrier-specific data. In one embodiment, the MSIM 48 includes logic or circuitry for selecting or activating one of the sets, so that the AM 30 has access to the specific carrier associated with that set. In one embodiment, the carrier associated with one of the sets is different from the carrier associated with another of the sets. In one embodiment, the carrier associated with one of the sets may be the same as the carrier associated with another of the sets, but the sets differ from each other in other aspects, such as IMSI number, list of services the user has access to, etc.

In some embodiments, an AM 30 may include distinct transceiver hardware for different transmission types (e.g., OFDM versus CDMA), in which case the MSIM 48 may enable multiple SIMs instances simultaneously, one for each distinct transceiver. In embodiments where the AM 30 uses the same transceiver hardware for different transmission types, the MSIM 48 may enable one of the SIM instances at a time. In such embodiments, the MSIM 48 may multiplex among the multiple SIM instances as rapidly as needed to allow the AM 30 to collect information from multiple carriers in what is essentially parallel operation.

Figure 3A:
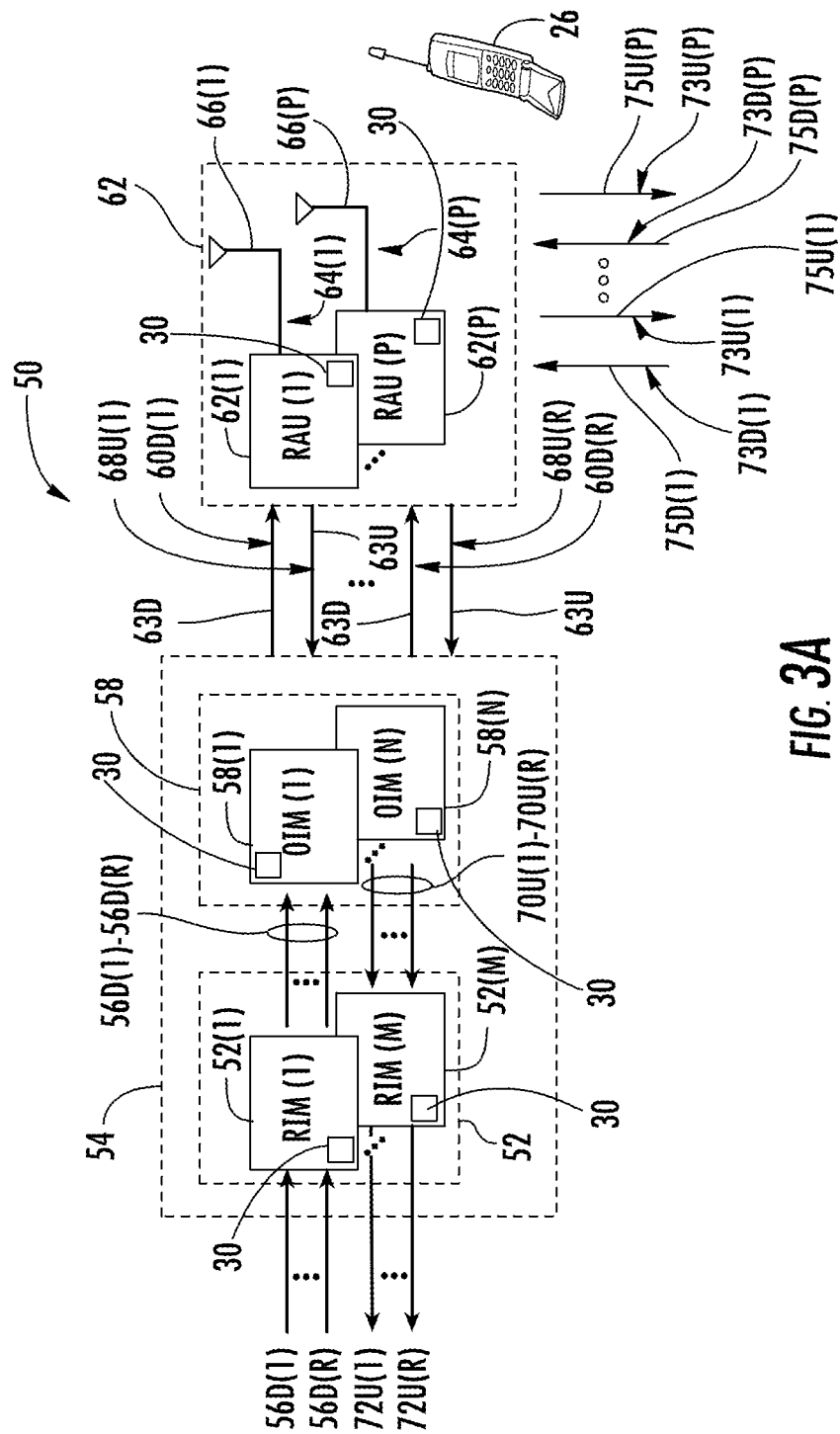
FIGS. 3A and 3B are schematic diagrams illustrating an exemplary optical fiber-based DAS that includes components in which the AM in FIG. 2 can be included.

FIG. 3A is a schematic diagram of another exemplary optical fiber-based distributed antenna system (DAS) 50 as an example of a WDCS that may include AMs 30 for monitoring of signals. In this embodiment, the optical fiber-based DAS 50 includes optical fibers for distributing RF communication services. The optical fiber-based DAS 50 in this embodiment is comprised of three (3) main components. One or more radio interfaces provided in the form of radio interface modules (RIMs) 52(1)-52(M) in this embodiment are provided in head end equipment (HEE) 54 to receive and process downlink electrical RF communications signals 56D(1)-56D(R) from one or more base stations 57(1)-57(T) (shown in FIG. 3B) prior to optical conversion into downlink optical RF communications signals. The RIMs 52(1)-52(M) provide both downlink and uplink interfaces. The notations "1-R," "1-M," "1-T," and the like, indicate that any number of the referenced component, e.g., 1-R, 1-M, etc., may be provided. AMs 30 can be included in the RIMs 52(1)-52(M) or provided in the same location, housing, or packaging as the RIMs 52(1)-52(M), to monitor the downlink electrical RF communications signals 56D(1)-56D(R) prior to optical conversion into downlink optical RF communications signals. As will be described in more detail below, the HEE 54 is configured to accept a plurality of RIMs 52(1)-52(M) as modular components that can easily be installed and removed or replaced in the HEE 54. In one embodiment, the HEE 54 is configured to support up to eight (8) RIMs 52(1)-52(8).

Each RIM 52(1)-52(M) can be designed to support a particular type of radio source or range of radio sources (i.e., frequencies) to provide flexibility in configuring the HEE 54 and the optical fiber-based DAS 50 to support the desired radio sources. For example, one RIM 52 may be configured to support the Personal Communication Services (PCS) radio band. Another RIM 52 may be configured to support the 700 MHz radio band. In this example, by inclusion of these RIMs 52, the HEE 54 would be configured to support and distribute RF communications signals on both PCS and LTE 700 radio bands. RIMs 52 may be provided in the HEE 54 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 52 may be provided in the HEE 54 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 52 may be provided in the HEE 54 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 56D(1)-56D(R) are provided to a plurality of optical interfaces provided in the form of optical interface modules (OIMs) 58(1)-58(N) in this embodiment to convert the downlink electrical RF communications signals 56D(1)-56D(N) into downlink optical RF communications signals 60D(1)-60D(R). An OIM 58 may also be referred to as an optical interface unit (OIU) 58. AMs 30 can also be included in the OIMs 58(1)-58(N), or provided in the same location, housing, or packaging as the OIMs 58(1)-58(N), to monitor the downlink electrical RF communications signals 56D(1)-56D(R) prior to optical conversion into downlink optical RF communications signals 60D(1)-60D(R). The notation "1-N" indicates that any number of the referenced component 1-N may be provided. The OIMs 58 may be configured to provide one or more optical interface components (OICs) that contain optical-to-electrical (O/E) and electrical-to-optical (E/O) converters, as will be described in more detail below. The OIMs 58 support the radio bands that can be provided by the RIMs 52, including the examples previously described above. Thus, in this embodiment, the OIMs 58 may support a radio band range from 400 MHz to 2700 MHz, as an example, so providing different types or models of OIMs 58 for narrower radio bands to support possibilities for different radio band-supported RIMs 52 provided in the HEE 54 is not required. Further, as an example, the OIMs 58 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 58(1)-58(N) each include E/O converters to convert the downlink electrical RF communications signals 56D(1)-56D(R) to downlink optical RF communications signals 60D(1)-60D(R). The downlink optical RF communications signals 60D(1)-60D(R) are communicated over downlink optical fiber(s) 63D to a plurality of remote antenna units (RAUs) 62(1)-62(P). The notation "1-P" indicates that any number of the referenced component 1-P may be provided. O/E converters provided in the RAUs 62(1)-62(P) convert the downlink optical RF communications signals 60D(1)-60D(R) back into downlink electrical RF communications signals 56D(1)-56D(R), which are provided over downlinks 64(1)-64(P) coupled to antennas 66(1)-66(P) in the RAUs 62(1)-62(P) to client devices 26 in the reception range of the antennas 66(1)-66(P). AMs 30 can also be included in the RAUs 62(1)-62(P), or provided in the same location, housing, or packaging as the RAUs 62(1)-62(P), to monitor the downlink electrical RF communications signals 56D(1)-56D(R).

Figure 3B:
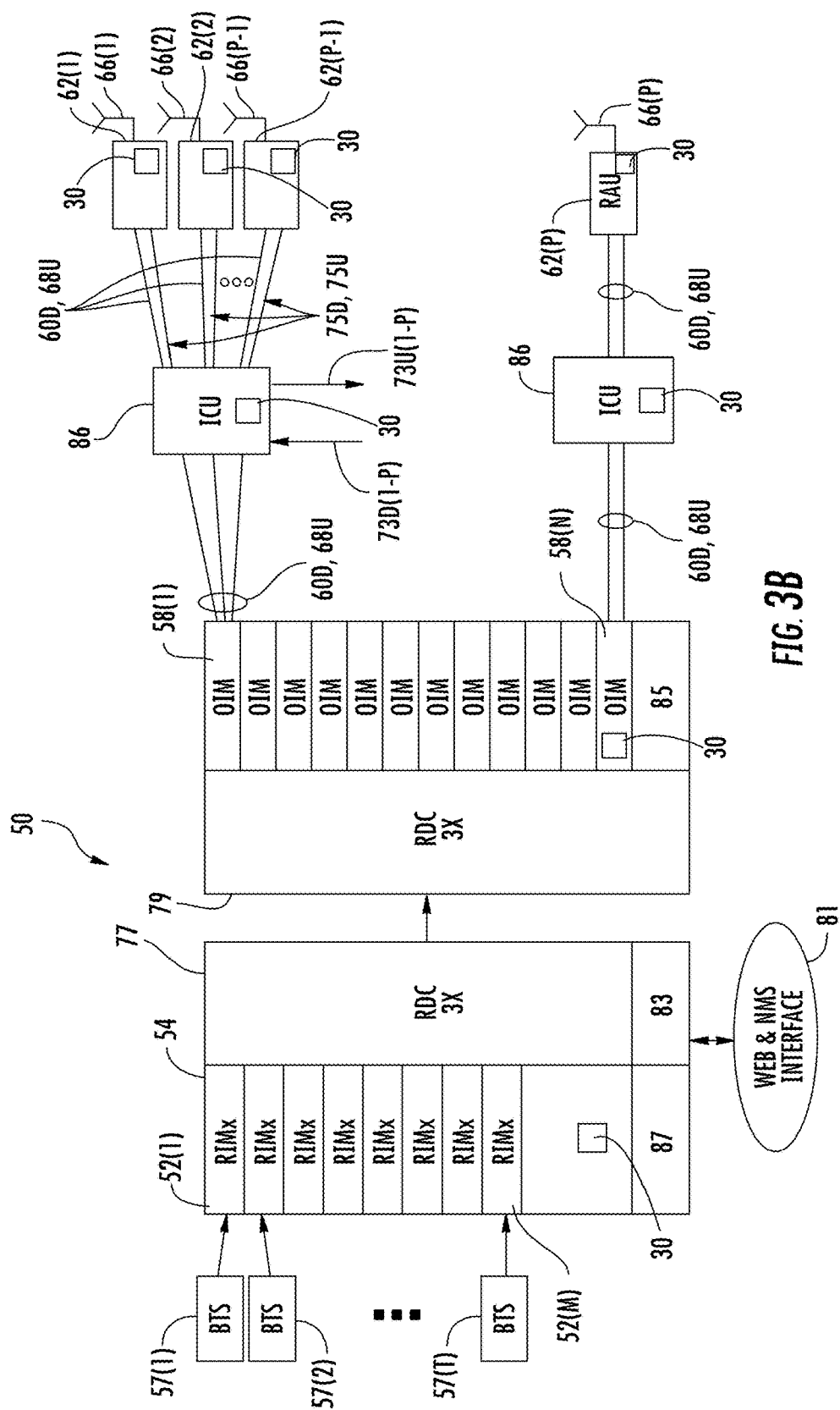

E/O converters are also provided in the RAUs 62(1)-62(P) to convert uplink electrical RF communications signals received from client devices 26 through the antennas 66(1)-66(P) into uplink optical RF communications signals 68U(1)-68U(R) to be communicated over uplink optical fibers 63U to the OIMs 58(1)-58(N). The AMs 30 associated with the RAUs 62(1)-62(P) can also monitor uplink electrical RF communications signals 70U(1)-70U(R). The OIMs 58(1)-58(N) include O/E converters that convert the uplink optical RF communications signals 68U(1)-68U(R) into uplink electrical RF communications signals 70U(1)-70U(R) that are processed by the RIMs 52(1)-52(M) and provided as uplink electrical RF communications signals 72U(1)-72U(R). Downlink electrical digital signals 73D(1)-73D(P), such as Ethernet signals, communicated over downlink electrical medium or media (hereinafter "medium") 75D(1)-75D(P) can be provided to the RAUs 62(1)-62(P), such as from a digital data services (DDS) controller and/or DDS switch as provided by example in FIG. 3B, separately from the RF communication services, as well as uplink electrical digital signals 73U(1)-73U(P) communicated over uplink electrical medium 75U(1)-75U(P), as also illustrated in FIG. 3B. AMs 30 associated with the OIMs 58(1)-58(N) and/or the RIMs 52(1)-52(M) can also monitor the uplink electrical RF communications signals 70U(1)-70U(R). Common elements between FIGS. 3A and 3B are illustrated in FIG. 3B with common element numbers. Power may be provided in the downlink and/or uplink electrical medium 75D(1)-75D(P) and/or 75U(1)-75U(P) to the RAUs 62(1)-62(P).

FIG. 3B is a schematic diagram of providing digital data services and RF communication services to RAUs and/or other remote communications units in the optical fiber-based DAS 50 of FIG. 3A. Common components between FIGS. 3A and 3B have the same element numbers and thus will not be re-described. As illustrated in FIG. 3B, a power supply module (PSM) 83 may be provided to provide power to the RIMs 52(1)-52(M) and radio distribution cards (RDCs) 77 that distribute the RF communications from the RIMs 52(1)-52(M) to the OIMs 58(1)-58(N) through RDCs 79. In one embodiment, the RDCs 77, 79 can support different sectorization needs. An interface 81, which may include web and network management system (NMS) interfaces, may also be provided to allow configuration and communication to the RIMs 52(1)-52(M) and other components of the optical fiber-based DAS 50. A PSM 85 may also be provided to provide power the OIMs 58(1)-58(N). A microcontroller, microprocessor, or other control circuitry, called a head-end controller (HEC) 87 may be included in HEE 54 to provide control operations for the HEE 54. The AMs 30 may also be incorporated into or associated with one or more interconnect units (ICUs) 86 to monitor power signals as the ICUs 86 provide power signals to the RAUs 62(1)-62(P) or route information about other monitored signals to other components or other AMs 30 in the DAS 50.

Figure 4:
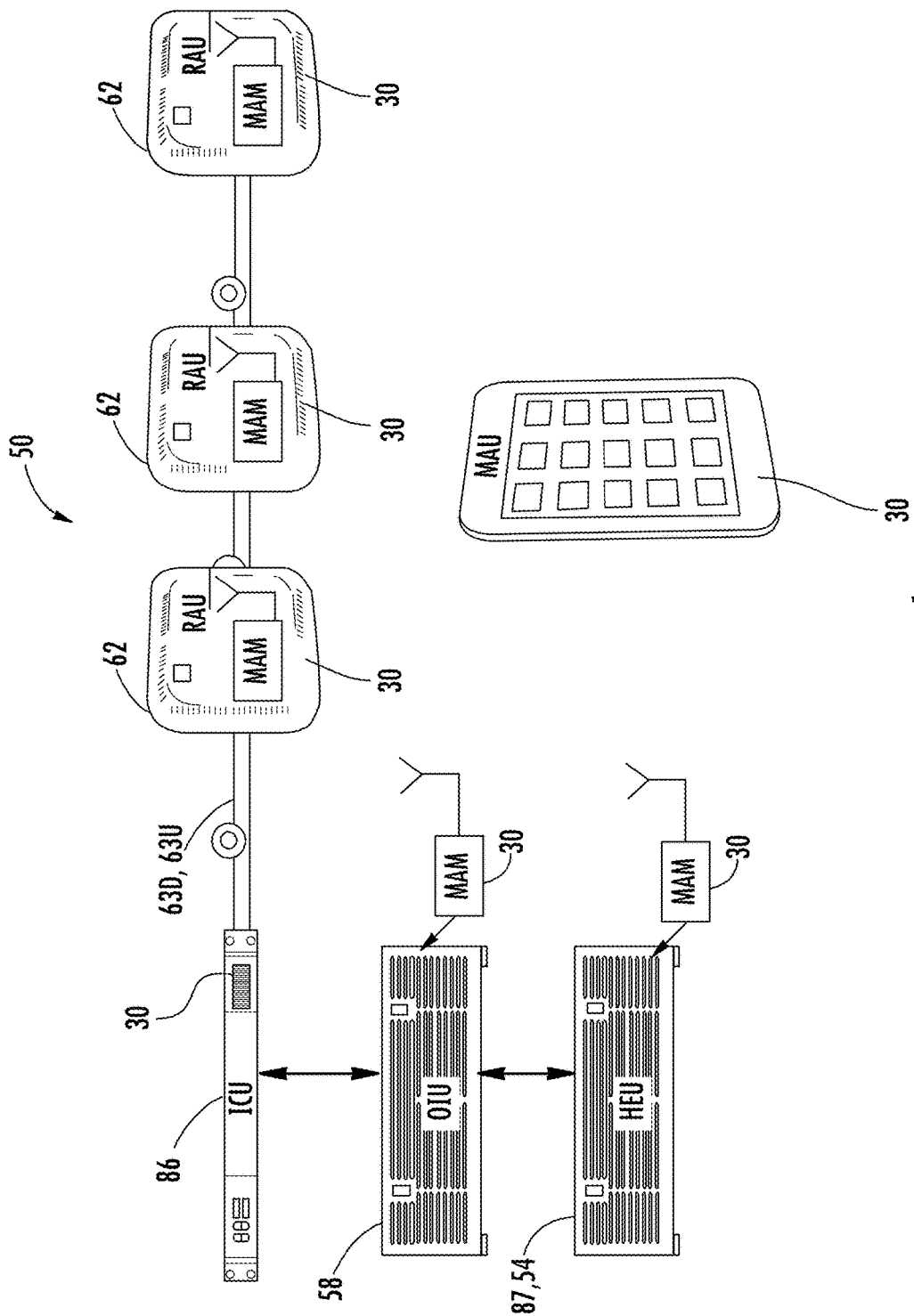
FIG. 4 is a schematic diagram of exemplary DAS components of a DAS in which the AM in FIG. 2 can be associated to monitor live signals in the WDCS, create application-level information about the monitored signals, and communicate the application-level information to other systems.

FIG. 4 is another schematic diagram of exemplary DAS components of the optical fiber-based DAS 50 in which the AM 30 in FIG. 2 can be associated with to monitor live signals in the WDCS, create application-level information about the monitored signals, and communicate the application-level information to other systems. In the embodiment illustrated in FIG. 4, the DAS 50 includes an HEU 54 that communicates with an OIU 58, which communicates with number of RAUs 62 via an ICU 86. The ICU 86 communicates with the RAUs 62 via downlink optical fiber(s) 63D and uplink optical fiber(s) 63U. In the embodiment illustrated in FIG. 4, each of the components within the DAS 50 includes an AM 30. When an AM 30 is a component within another node, as is the case the HEU 54, the OIU 58, the ICU 86, and the RAUs 62, it may be referred to as a "multi-application module," or MAM 30. When an AM 30 is a stand-alone entity, it may be referred to as a "multi-application unit," or MAU 30. This is reflected in FIG. 4, which includes six MAMs (one in each of the RAUs 62, one in the ICU 86, one in the OIU 58, and one in the HEU 54) and one MAU.

In general, a MAM comprises multi-technology wireless telecommunication circuitry that is embodied into power- and process-optimized mobile UE with multiple sensors and with a multiple-application software platform architecture. A MAM is generally intended to be physically co-located with different components within a WDCS. A MAU may be thought of as a version of a MAM that is in a separate package and that communicates with the WDCS via a wired or wireless connection.

The AM 30 can communicate application layer data 38 as client devices in the DAS 50 to other devices outside the DAS 50, or to other AMs 30 in other components in the DAS 50. The AM 30 may also serve as a network device, such as an access point, to collect monitored signal information, including application-level information, from other AMs 30 and/or components in the DAS 50, which can be passed along to other components or systems.

Figure 5:
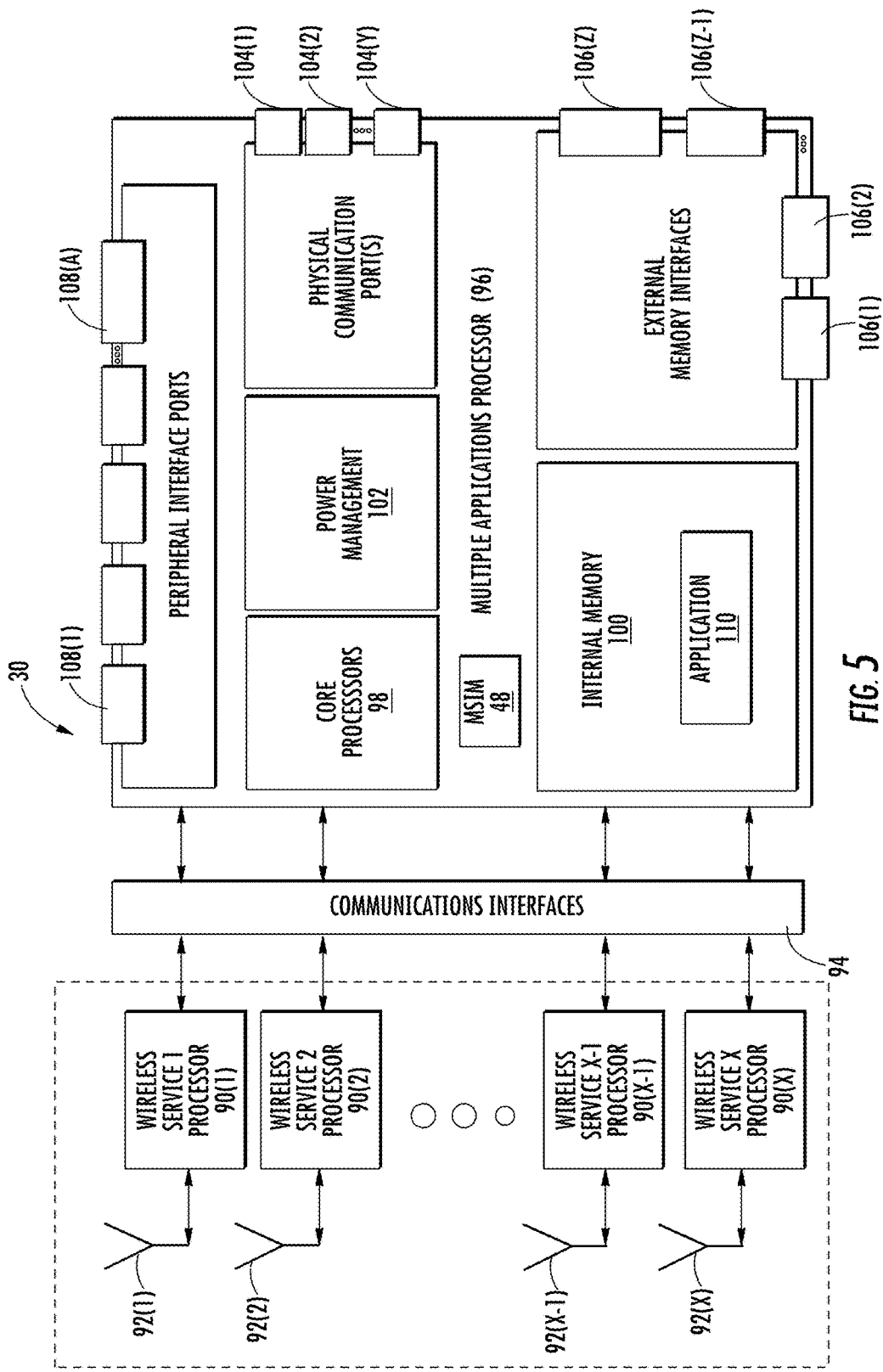
FIG. 5 is a schematic diagram illustrating exemplary internal components of the AM with an MSIM for diagnostic mode monitoring of signals in components in WDCSs according to an embodiment of the present disclosure in FIG. 2.

FIG. 5 is a schematic diagram illustrating exemplary internal components of the AM 30 in FIG. 2 to monitor signals in a component of a WDCS, including but not limited to the DAS 50 in FIGS. 3A and 3B. As illustrated in FIG. 5, the AM 30 includes a series of wireless service processors 90(1)-90(X) that are configured to receive wireless communications signals over respective antennas 92(1)-92(X). The wireless service processors 90(1)-90(X) facilitate the AM 30 communicating application-level information, such as the application-level information 38 in FIG. 2, received through a communications interface 94 wirelessly in a WDCS, as another client device. The wireless service processors 90(1)-90(X) also facilitate the AM 30 being able to communicate application-level information wired or wirelessly to other systems outside the WDCS, if desired.

With continuing reference to FIG. 5, the AM 30 includes a processor-based system 96 that may include multiple processors or a multi-core processor 98, as examples, (hereinafter "processor 98") where application layer applications reside and are executed. As discussed above with reference to FIG. 2, the application layer applications 32 monitor signals in a WDCS and provide the application-level information 38 regarding such monitored signals over the communications interface 94 to other systems, within and/or outside of a WDCS. The application layer applications 32 are stored in internal memory 100. The application-level information 38 can also be stored by the processor 98 in the internal memory 100. In the embodiment illustrated in FIG. 5, the processor-based system 96 includes a power management module 102 to manage power consumption in the processor-based system 96, such as to achieve the desired performance levels. The AM 30 also includes one or more physical communications ports 104(1)-104(Y) to allow wired communications to be provided to and from the AM 30, if desired. For example, a technician may connect a wired communication device to one of the physical communications ports 104(1)-104(Y) to retrieve application-level information 38 or load or update application layer applications 32. The AM 30 may also include one or more external memory interfaces 106(1)-106(Z), such as memory card ports, USB ports, etc., for storing data from the internal memory 100, including application-level information 38. The AM 30 may also include one or more peripheral interface ports 108(1)-108(A) for connecting other peripheral devices to the AM 30. In one embodiment, the internal memory 100 may include an application 110 in the form of instructions that are configured to be executed by a core processor(s) 98. The application 110 may be configured to analyze downlink communications signals and/or the uplink communications signals and to communicate application-level information regarding the analyzed signals to another system.

Figure 6A:
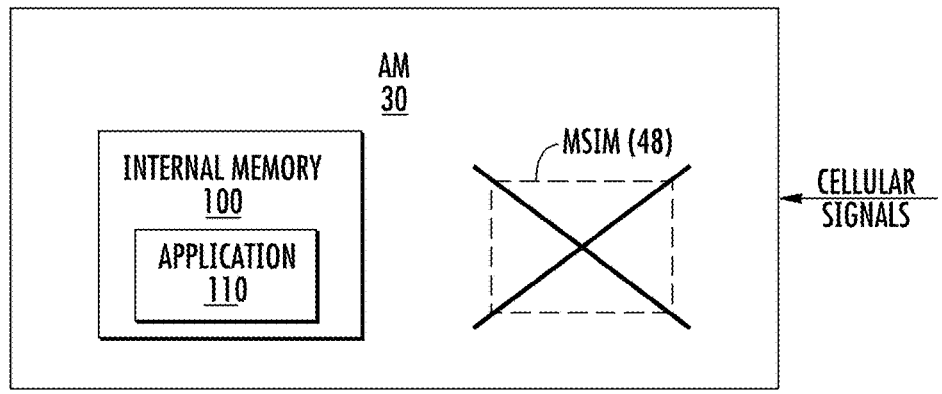
FIG. 6A illustrates an exemplary AM in a scanning operation mode according to an embodiment of the present disclosure.

FIG. 6A illustrates an exemplary AM 30 in a scanning operation mode according to an embodiment of the present disclosure. For simplicity of explanation, the embodiment of the AM 30 shown in FIG. 6A includes an MSIM 48, a memory 100, and an application 110, but it will be understood that the AM 30 may contain other components not shown in this figure. Because a SIM card is not required for an AM to operating in a scanning mode in which the AM collects signal identification parameters and signal levels, in the embodiment illustrated in FIG. 6A, the MSIM 48 within the AM 30 has been deactivated or delinked.

Figure 1:
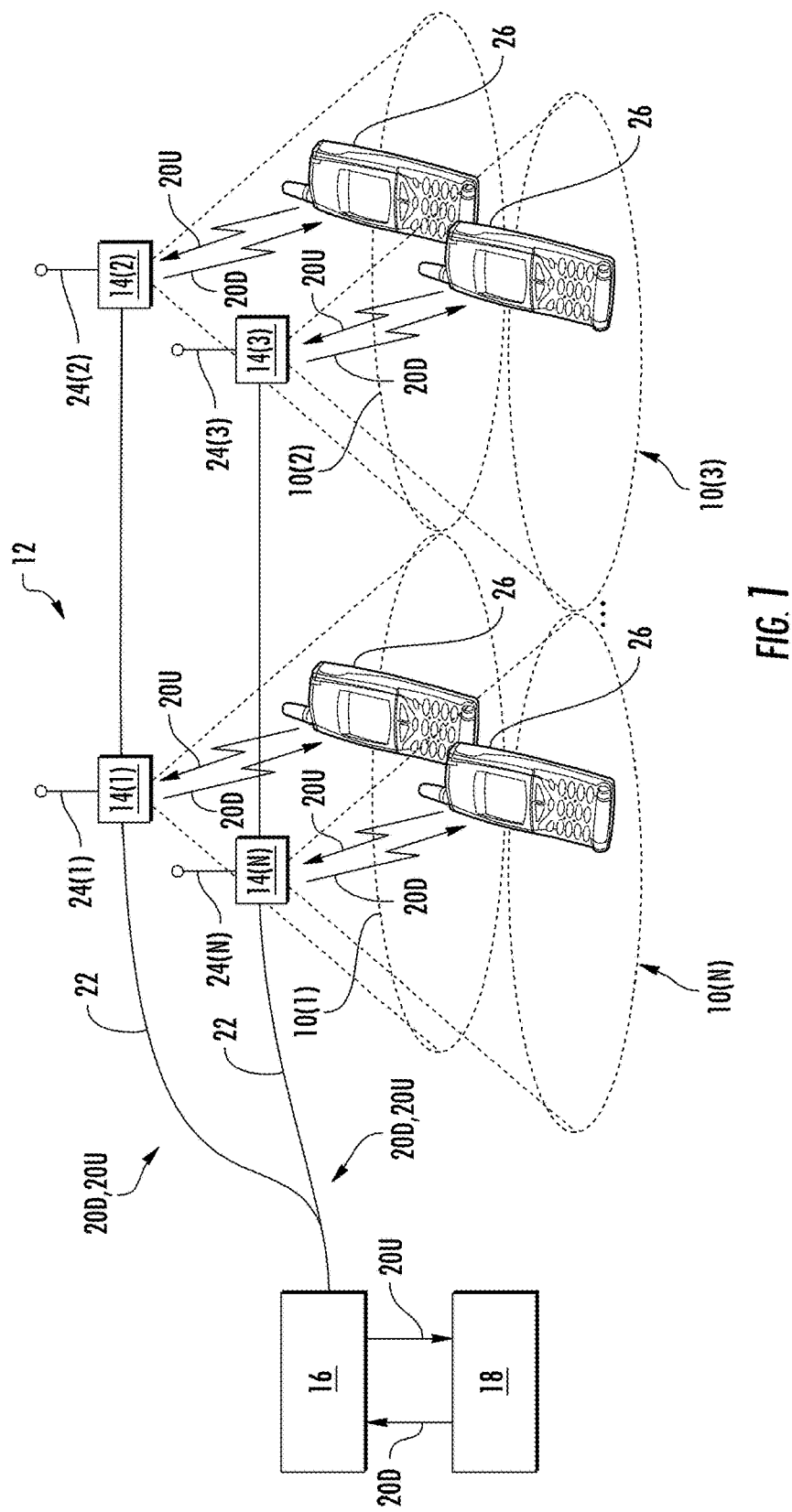
FIG. 1 is a schematic diagram of an exemplary wireless distributed communications system (WDCS) in the form of a distributed antenna system (DAS) capable of distributing radio frequency (RF) communications services to client devices.
Figure 6B:
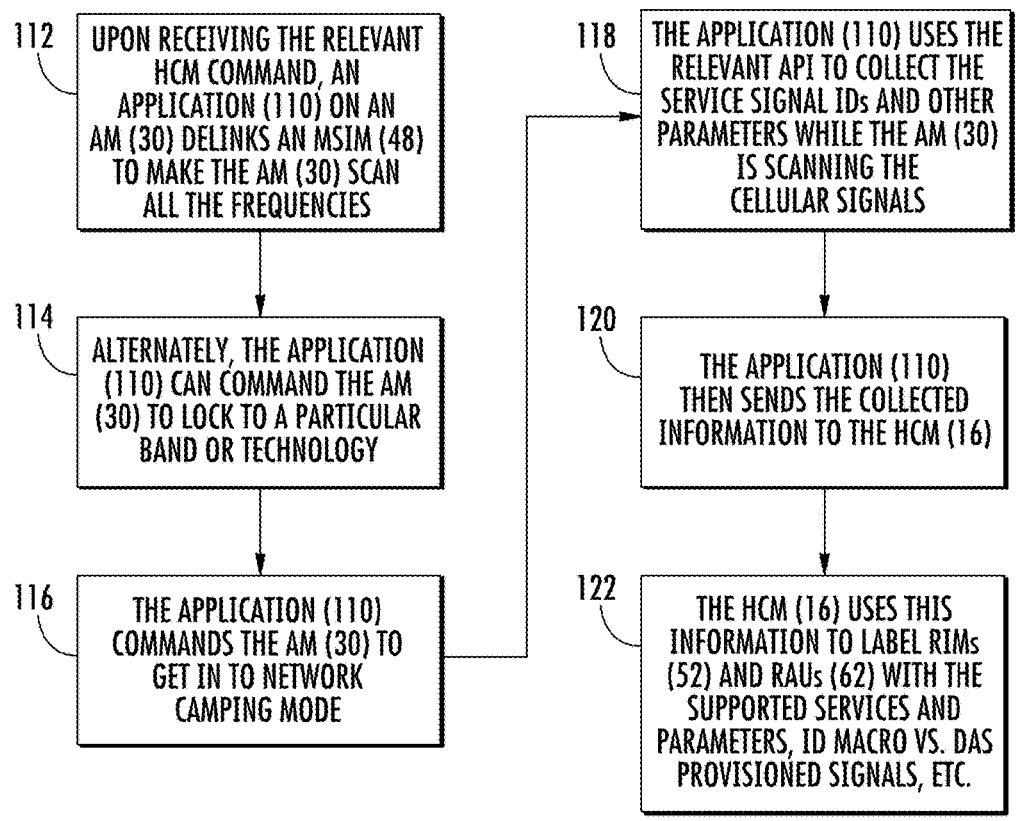
FIG. 6B is a flowchart illustrating an exemplary process of the AM in FIG. 6A to monitor live signals in the WDCS, create application-level information about the monitored signals, and communicate the application-level information to other systems.

FIG. 6B is a flowchart illustrating an exemplary process of the AM 30 in FIG. 6A to monitor live signals in a WDCS, such as the DAS 50 of FIG. 3A, create application-level information about the monitored signals, and communicate the application-level information to other systems. The process begins when the AM 30 receives a command from a central unit 16, such as is illustrated in FIG. 1 (block 112). A central unit 16 may also be called an HEU 16 or a headend control module (HCM) 16; therefore, the command received by the AM 30 may be referred to as an "HCM command." Upon receiving the HCM command, the application 110 on the AM 30 delinks the MSIM 48 to make the AM 30 scan all frequencies. Alternatively, the application 110 may command the AM 30 to lock to a particular frequency band or technology (block 114). The application 110 commands the AM 30 to enter a network camping mode (block 116). The application 110 uses a relevant application programing interface (API) to collect the service signal IDs and other parameters while the AM 30 is scanning the cellular signals (block 118). Examples of service signal IDs include, but are not limited to, a primary synchronization signal (PSS), a secondary synchronization signal (SSS), a cell-specific reference signal (CRS), and the like. The application 110 then sends the collected information to the HCM 16 (block 120). The HCM 16 uses the information to label the RIMs 52 and RAUs 62 with the supported services and parameters, the identity of macros versus DAS-provisioned signals, etc. (block 122).

Figure 7A:
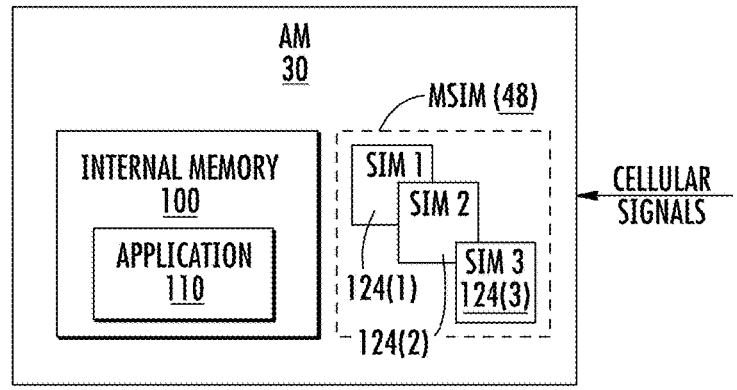
FIG. 7A illustrates an exemplary AM in a diagnostic operation mode according to another embodiment of the present disclosure.

FIG. 7A illustrates an exemplary AM 30 in a diagnostic operation mode according to another embodiment of the present disclosure. For simplicity of explanation, the embodiment of the AM 30 shown in FIG. 7A includes an MSIM 48, a memory 100, and an application 110, but it will be understood that the AM 30 may contain other components not shown in this figure. FIG. 7A illustrates an embodiment in which the MSIM 48 includes multiple instances of a SIM cards or their circuit equivalents 124. In the embodiment illustrated in FIG. 7A, the MSIM 48 includes three SIM cards 124(1)-124(3), but in alternative embodiments, the MSIM 48 may contain other numbers of SIM cards or their equivalents.

Figure 7B:
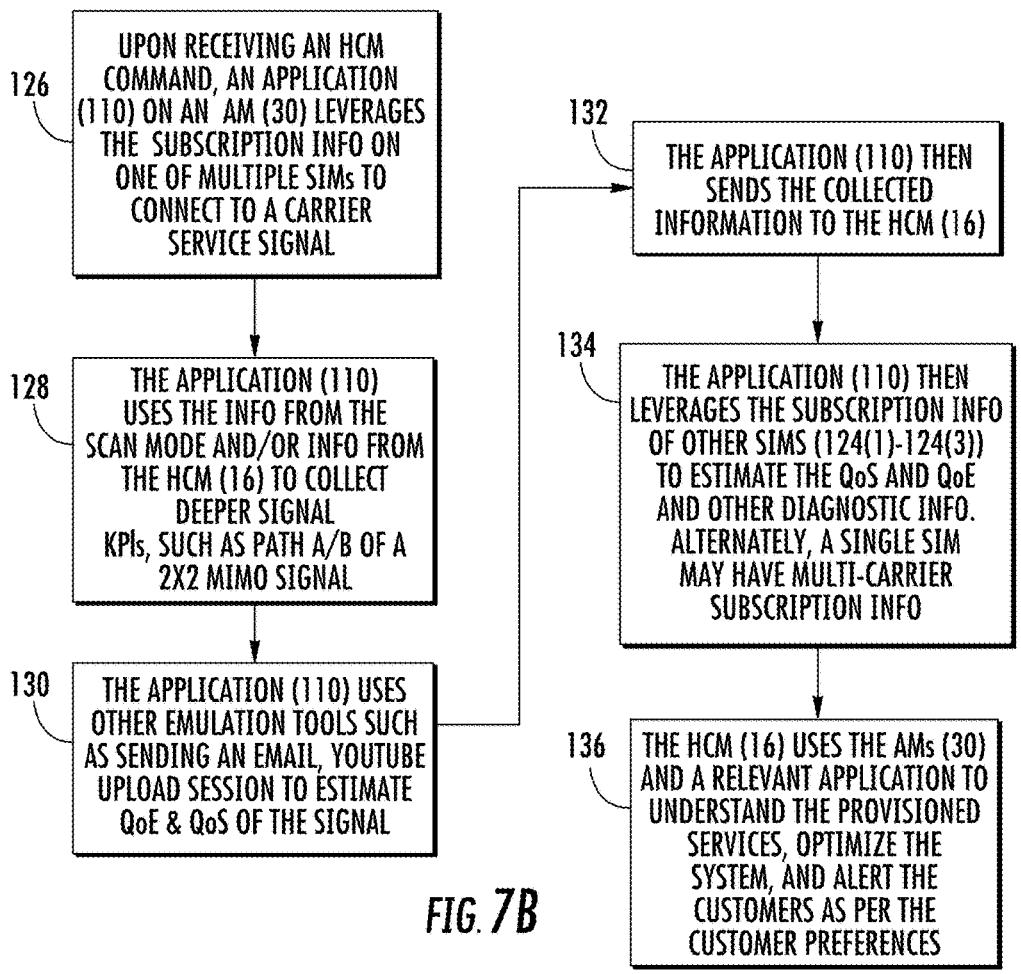
FIG. 7B is a flowchart illustrating an exemplary process of the AM in FIG. 7A to monitor live signals in the WDCS, create application-level information about the monitored signals, and communicate the application-level information to other systems.

FIG. 7B is a flowchart illustrating an exemplary process of the AM 30 in FIG. 7A to monitor live signals in the WDCS, create application-level information about the monitored signals, and communicate the application-level information to other systems. The process begins when the AM 30 receives an HCM command to use subscription information contained within the MSIM 48 to connect to a carrier service signal (block 126). The application 110 then uses information that was collected by the AM 30 (or provided by the HCM 16) to collect deeper signal key performance indicators (KPIs), such as path A or path B of a 2×2 MIMO signal (block 128). The application 110 uses other emulation tools, such as sending an email, uploading a video, etc., to estimate quality of service (QoS), quality of experience (QoE), or other diagnostic information (block 130). The application 110 then sends the collected data to the HCM 16 (block 132).

In the embodiment illustrated in FIG. 7B, the application 110 then uses the subscription information contained with the MSIM 48 to collect information, estimate QoS and QoE, and perform other diagnostic analysis on signals from another carrier (block 134). To do this, the MSIM 48 may access information within another SIM card 124. In some embodiments, a SIM card 124 or equivalent circuit may contain multi-carrier subscription information, in which case the same SIM card 124 may be accessed to get information for more than one carrier. In the embodiment illustrated in FIG. 7B, the HCM 16 uses the AMs 30 and a relevant application to understand the provisioned services, to optimize the system, and to alert the customers as per the customer preferences (block 136).

Figure 8A:
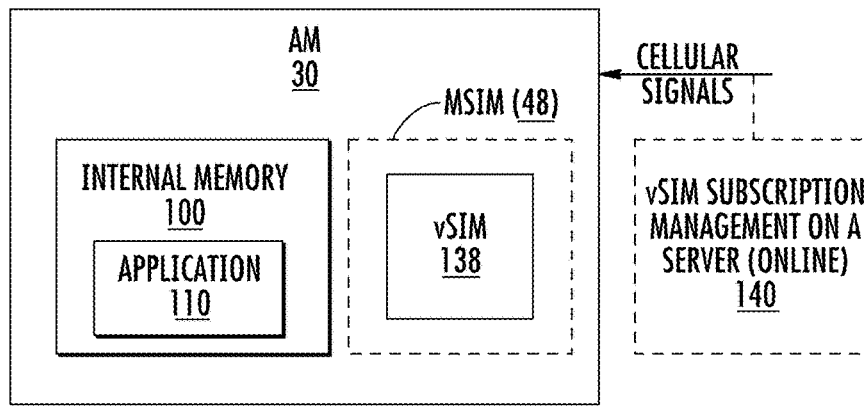
FIG. 8A illustrates an exemplary AM in a diagnostic operation mode according to another embodiment of the present disclosure.

FIG. 8A illustrates an exemplary AM 30 in a diagnostic operation mode according to another embodiment of the present disclosure. For simplicity of explanation, the embodiment of the AM 30 shown in FIG. 7A includes an MSIM 48, a memory 100, and an application 110, but it will be understood that the AM 30 may contain other components not shown in this figure. FIG. 8A illustrates an embodiment in which the MSIM 48 includes one or more instances of a virtualized SIM 138, which may be an eSIM, softSIM, etc. The AM 30 may be provisioned with the vSIM 138 from a subscription management server 140 that communicates with the AM 30 via cellular signals or otherwise.

Figure 8B:
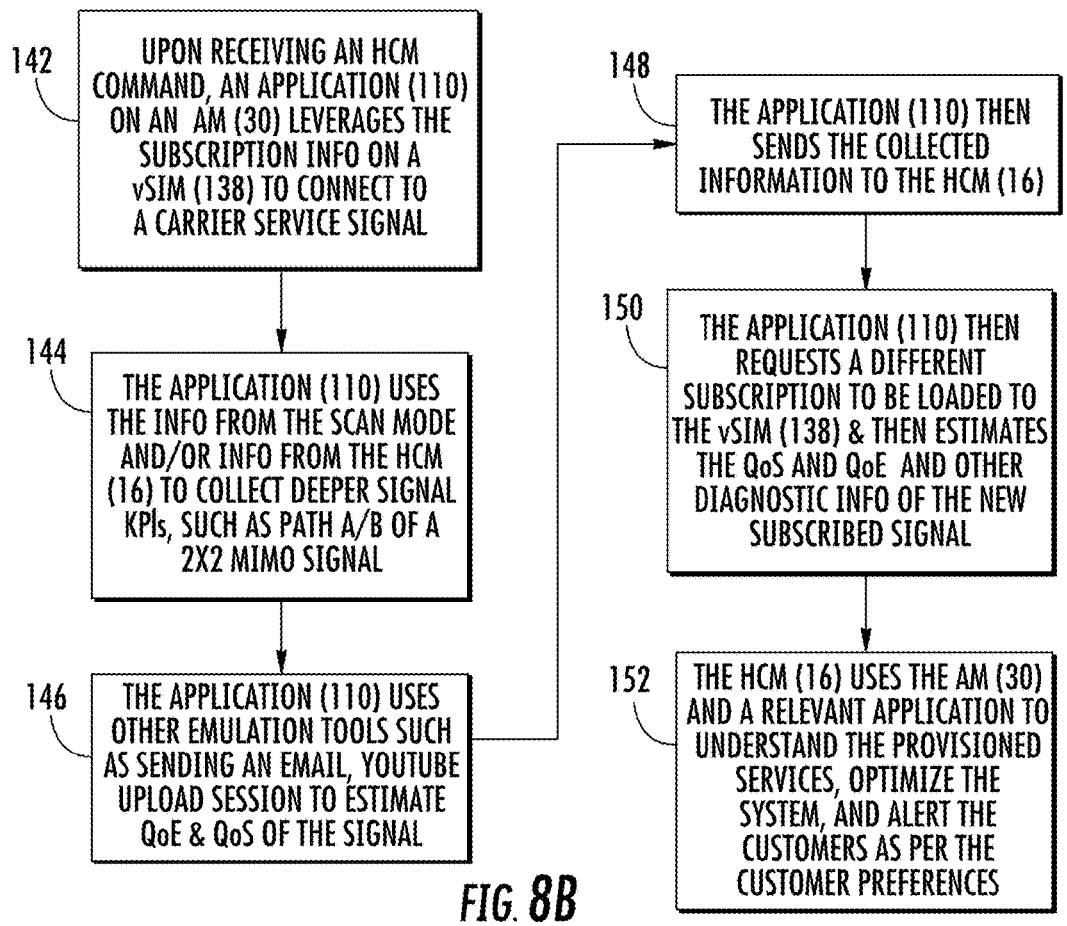
FIG. 8B is a flowchart illustrating an exemplary process of the AM in FIG. 8A to monitor live signals in the WDCS, create application-level information about the monitored signals, and communicate the application-level information to other systems.

FIG. 8B is a flowchart illustrating an exemplary process of the AM 30 in FIG. 8A to monitor live signals in the WDCS, create application-level information about the monitored signals, and communicate the application-level information to other systems. The process begins when the AM 30 receives an HCM command to use subscription information contained within the MSIM 48 to connect to a carrier service signal (block 142). The application 110 then uses information that was collected by the AM 30 (or provided by the HCM 16) to collect deeper signal KPIs, such as path AB of a 2×2 MIMO signal (block 144). The application 110 uses other emulation tools, such as sending an email, uploading a video, etc., to estimate QoS, QoE, or other diagnostic information (block 146). The application 110 then sends the collected data to the HCM 16 (block 148).

In the embodiment illustrated in FIG. 7B, the application 110 then requests different subscription information to be loaded to the vSIM 138, and then estimates the QoS, QoE, and other diagnostic information of the newly subscribed signal (block 150). The HCM 16 uses the AMs 30 and the relevant application to understand the provisioned services, optimize the system, and alert the customer as per the customer preferences (block 152).

Figure 9:
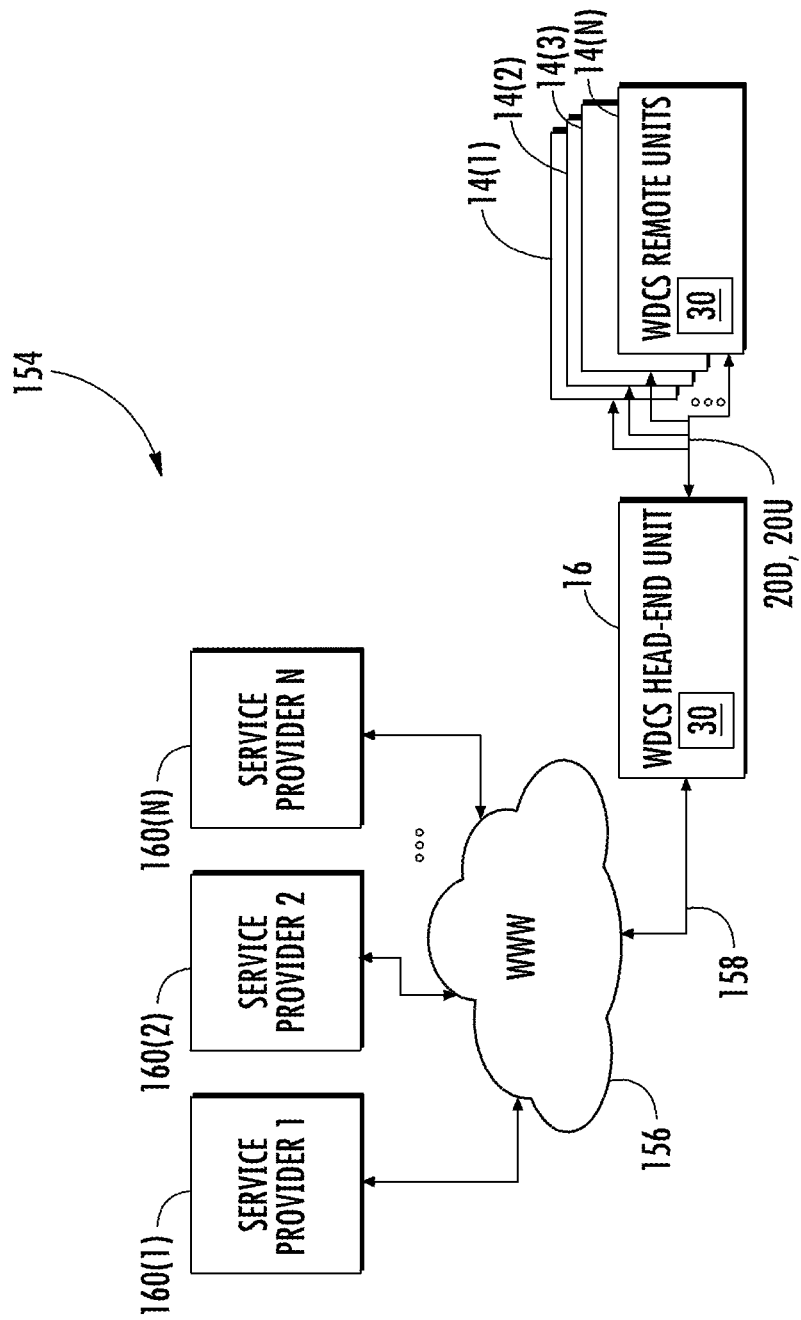
FIG. 9 illustrates an exemplary WDCS according to another embodiment of the present disclosure.

FIG. 9 illustrates an exemplary WDCS 154 according to another embodiment of the present disclosure. WDCS 154 includes a head-end unit 16 that is configured to send downlink communications signals 20D to remote antenna units 14(1)-14(N), which are configured to receive the downlink communications signals 20D and distribute them to the respective coverage areas of the remote antenna units 14(1)-14(N). Each remote antenna unit 14(1)-14(N) may include an RF transmitter/receiver and respective antenna operably connected to the RF transmitter/receiver to wirelessly distribute the communications services to client devices within each remote antenna unit's 14(1)-14(N) respective coverage areas (not shown). The remote antenna units 14(1)-14(N) are also configured to receive uplink communications signals 20U from client devices in each remote antenna unit's 14(1)-14(N) respective coverage areas to the head-end unit 16. In the embodiment illustrated in FIG. 9, the head-end unit 16 and at least one of the remote antenna units 14(1)-14(N) includes an AM 30.

In the embodiment illustrated in FIG. 9, the WDCS 154 is communicatively coupled to a network 156, such as the Internet or World Wide Web, via a communication channel 158, which may be one or more wired or wireless connection(s). Through the communication channel 158, the head-end unit 16, the remote antenna units 14(1)-14(N), and any network devices being served by the respective remote antenna units 14(1)-14(N), can communicate with one or more service providers 160(1)-160(N).

Figure 10:
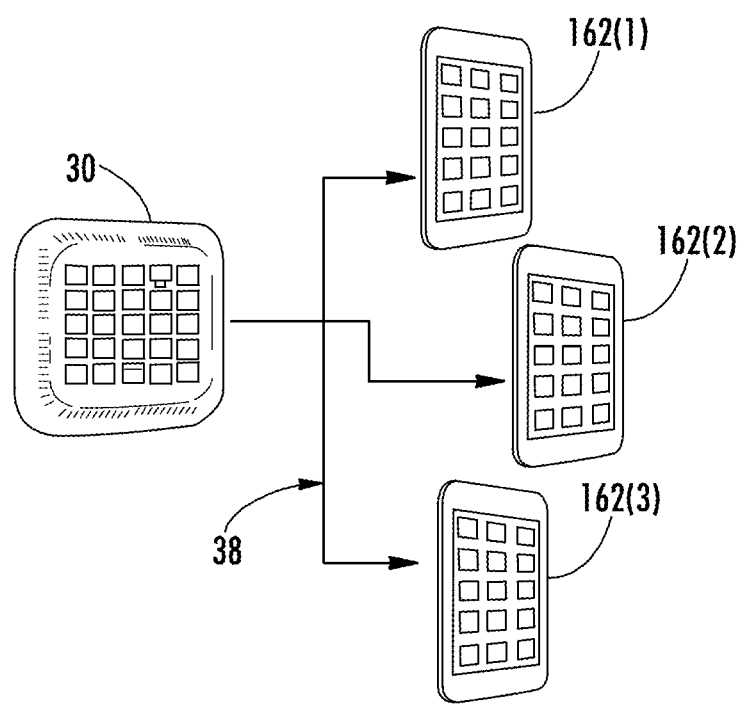
FIG. 10 is schematic diagram of a AM wirelessly communicating application-level information about monitored signals to other portable devices.

FIG. 10 is a schematic diagram of an AM 30 wirelessly, or through wired communication, communicating application-level information 38 about monitored signals to other portable devices 162(1)-162(3). With reference back to FIG. 2, the AM 30 can simply execute the application layer application 32 to process the monitored signals to generate the application-level information 38.

Figure 11:
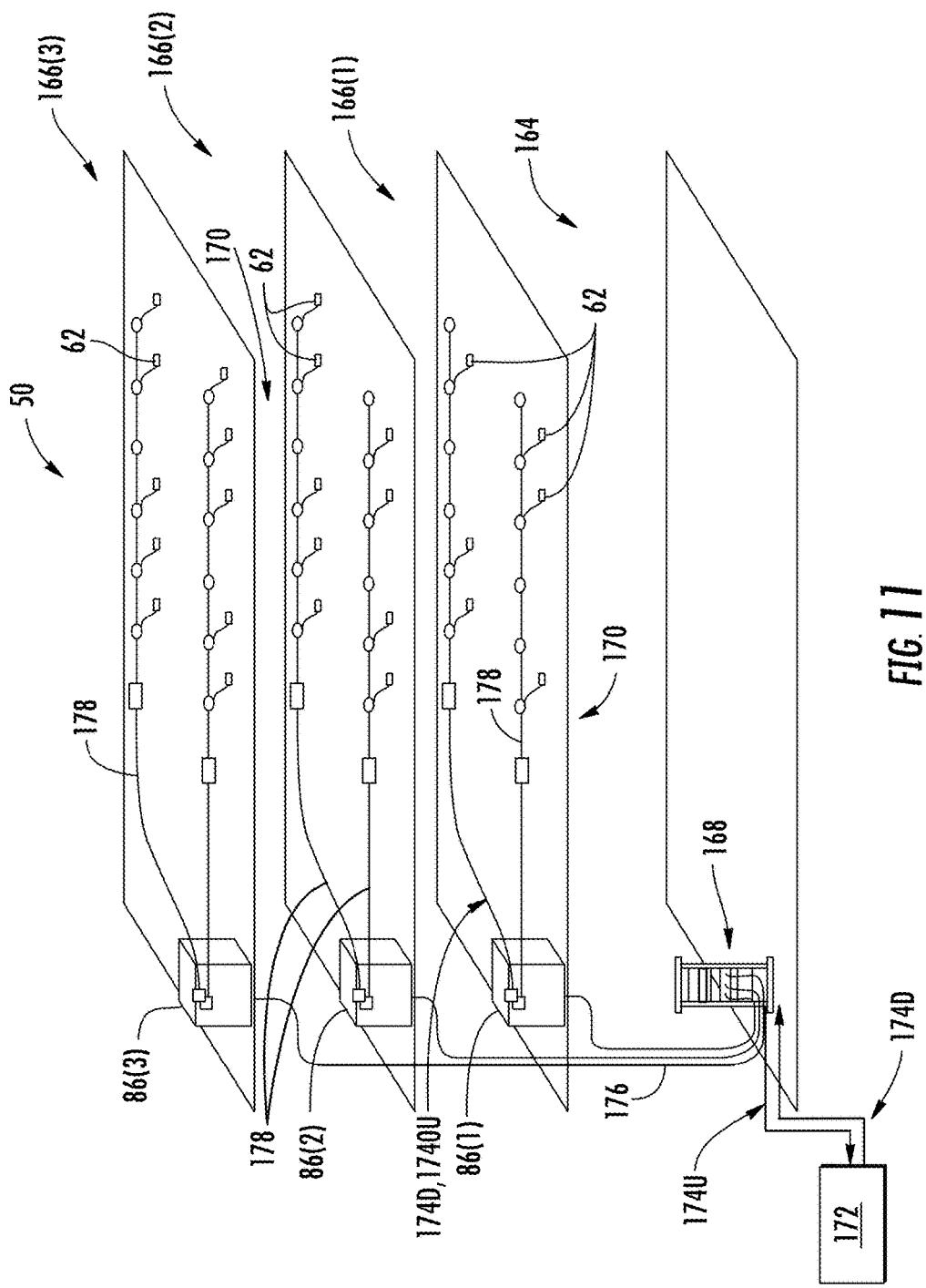
FIG. 11 is a partially schematic cut-away diagram of an exemplary building infrastructure in which a DAS including one or more components associated with AMs can be employed.

FIG. 11 is a partially schematic cut-away diagram of a building infrastructure 162 employing the DAS 50 described herein, provided in an indoor environment. The building infrastructure 162 in this embodiment includes a first (ground) floor 166(1), a second floor 166(2), and a third floor 166(3). The floors 166(1)-166(3) are serviced by a central unit 168 to provide the antenna coverage areas 170 in the building infrastructure 164. The central unit 168 is communicatively coupled to a base station 172 to receive downlink communications signals 174D from the base station 172. The central unit 168 is communicatively coupled to the remote antenna units 62 to receive uplink communications signals 174U from the remote antenna units 62, as previously discussed above. The downlink and uplink communications signals 174D, 174U communicated between the central unit 168 and the remote antenna units 62 are carried over a riser cable 176. The riser cable 176 may be routed through interconnect units (ICUs) 86(1)-86(3) dedicated to each floor 166(1)-166(3) that route the downlink and uplink communications signals 174D, 174U to the remote antenna units 62 and also provide power to the remote antenna units 62 via array cables 178.

Figure 12:
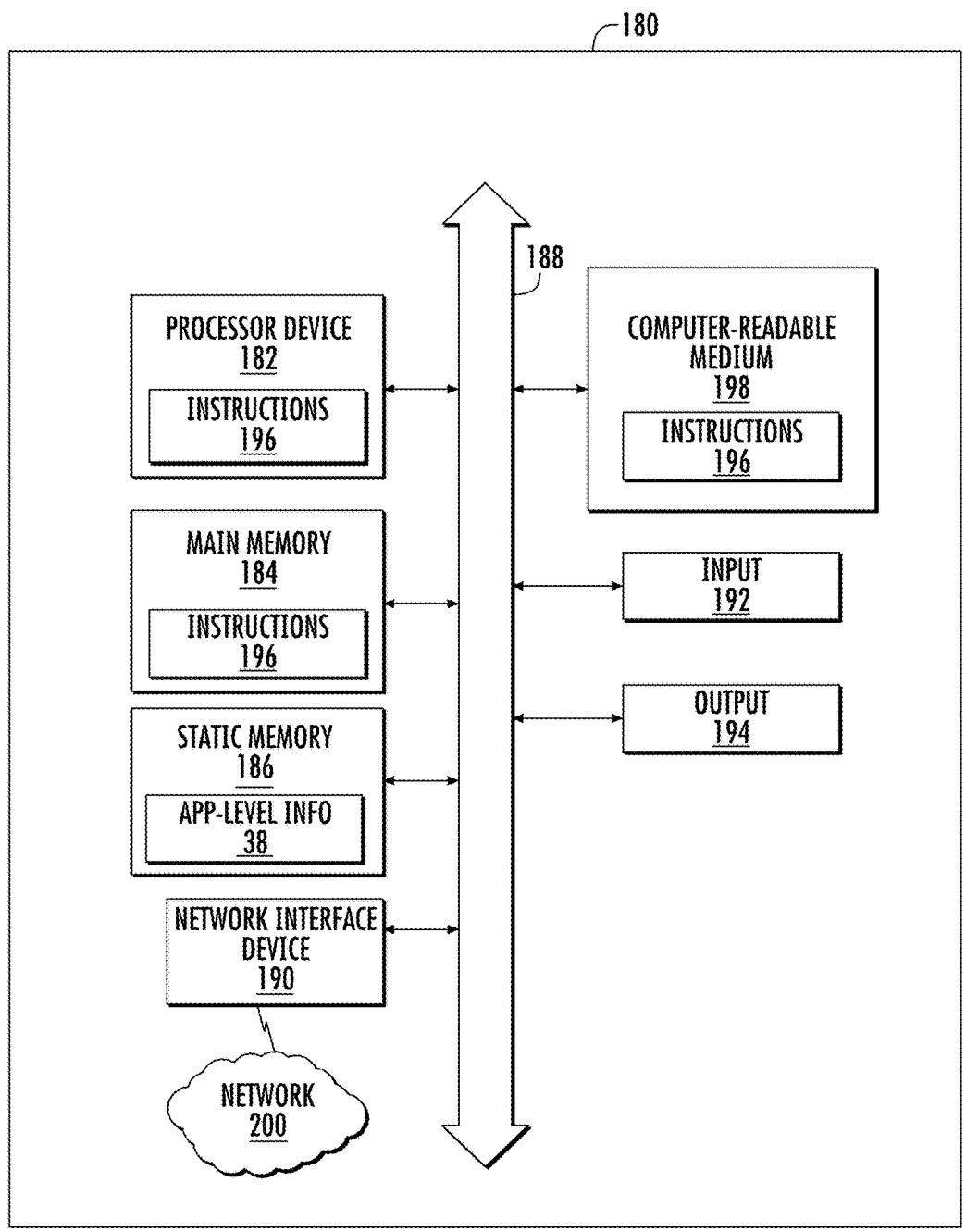
FIG. 12 is a schematic diagram of a generalized representation of an exemplary computer system that can be included in an AM provided in a WDCS, wherein the exemplary computer system is adapted to execute instructions from an exemplary computer readable medium.

FIG. 12 is a schematic diagram representation of additional detail illustrating a computer system 180 that could be employed in any AM 30 disclosed herein. The computer system 180 is adapted to execute instructions for an application layer application 32 from an exemplary computer-readable medium to perform these and/or any of the functions or processing described herein. In this regard, the computer system 180 in FIG. 9 may include a set of instructions that may be executed to calculate gain of DAS segment in a DAS. The computer system 180 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 180 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 180 in this embodiment includes a processing device or processor 182, a main memory 184 (e.g., read-only memory (ROM), flash memory, dynamic random access memory (DRAM), such as synchronous DRAM (SDRAM), etc.), and a static memory 186 (e.g., flash memory, static random access memory (SRAM), etc.), which may communicate with each other via a data bus 188. Alternatively, the processor 182 may be connected to the main memory 184 and/or static memory 186 directly or via some other connectivity means. The processor 182 may be a controller, and the main memory 184 or static memory 186 may be any type of memory. Application-level information 38 may be stored in static memory 186.

The processor 182 represents one or more general-purpose processing devices, such as a microprocessor, central processing unit, or the like. The processor 182 may be the processor 98 in the AM 30 in FIG. 5. More particularly, the processor 182 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 182 is configured to execute processing logic in instructions for performing the operations and steps discussed herein.

The computer system 180 may further include a network interface device 190. The computer system 180 also may or may not include an input 192, configured to receive input and selections to be communicated to the computer system 180 when executing instructions. The computer system 180 also may or may not include an output 194, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 180 may or may not include a data storage device that includes instructions 196 stored in a computer-readable medium 198. The instructions 196 may also reside, completely or at least partially, within the main memory 184 and/or within the processor 182 during execution thereof by the computer system 180, the main memory 184 and the processor 182 also constituting computer-readable medium. The instructions 196 may further be transmitted or received over a network 200 via the network interface device 190.

While the computer-readable medium 198 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

Providing multiple SIM instances within a single, specially adapted UE or UE-like device and operating the diagnostic tool as one of the many possible applications solves multiple problems simultaneously. The devices described herein can operate in both the scanning mode and the diagnostic mode. The information from both of these modes can be used in different applications, such as MIMO cell bonding, capacity routing/clustering, MACRO/in-building network optimization, interference mitigation, and others. These devices enable the multi-carrier subscription necessary for deep diagnostics of the provided service signals. By running the diagnostic tool as one of the many applications, the cost of the single UE can further be shared by other applications such as E911, wireless graphic user interface (GUI) access, self-organizing networks (SONs), etc. For example, for Voice over LTE (VoLTE), voice QoS can be tested by sending an audio file from one AM to an audio receiver on another AM and vice versa. When deployed as a parallel overlay, the subject matter of the present disclosure can be used to determine antenna level. The invention can also give antenna level KPIs, QoS, and QoE of a passive network. The methods and system described herein make it possible to perform calibration with live signals and to perform troubleshooting in a manner that does not impact service.

The subject matter of the present disclosure provides a number of distinct advantages over conventional methods and systems:

Provisioning a DAS with a MAM/MAU-based cellular scanning and diagnostic tool brings single antenna/RAU level signal visibility into the coverage environment.

A single AM can support not only the scanning and diagnostic capabilities described above, but also other applications, such as direct access to a remote antenna unit via cellular backhaul, allowing carriers to view and control remotes directly, just like they can currently control base stations. This enables a complete end-to-end system optimization. E911 functionality is another application that could also be supported by an AM.

AMs as described herein provide multi-carrier signal scanning and analysis without the need for redundant hardware, resulting in lower cost when compared to conventional solutions.

Scanning and diagnostic applications can be developed by multiple vendors as per carrier preference, and can be upgraded independent of other applications on the MAM/MAU—thereby improving development time and maintenance cycles of the applications.

While not being limited thereto, some example embodiments of the present disclosure are provided below.

According to one aspect, a WDCS comprises MAMs at a head-end unit as well as at remote units, and a wirelessly connected MAU. In terms of implementation, the WDCS may be analog, digital, or a combination; the cellular services may be provisioned by the head-end unit, with or without integrated capacity source, with the remote units being in analog or digital signal format. In one embodiment, the WDCS is provisioned with MAMs in the head-end unit and the remote antenna units and with MAUs in the respective coverage areas of the remote antenna units. The MAMs and MAUs may be connected to the WDCS via wired and/or wireless connections. In one embodiment, the MAMs and MAUs may use relevant contextual data from other applications as well to improve the application of cellular signal scanning/diagnostics and its related applications. In one embodiment, the MAMs and MAUs may also have centralized orchestration, reporting, and post data processing layers and/or APIs to third party applications.

According to another aspect, a scanning application (and/or derivative application) is provided on an AM. The scanning application disconnects (or emulates disconnecting) the SIM instance to force the AM switch to scanning or network camping mode, during which the AM captures carrier ID, signal type, and available KPIs of the signal upon which the AM is camping. In one embodiment, such data is internally used to label different components of the WDCS dynamically and to capture changes in the KPIs as per the requirements. In one embodiment, the application(s) may be controlled by an external element or internal command from within the AM.

According to another aspect, a cellular diagnostic application on an AM leverages multiple on-board SIMs to access multiple carrier signals simultaneously, sequentially, or in an intermixed fashion. In one embodiment, the AM switches between the carriers automatically and/or periodically to help diagnose all the provisioned signals of the WDCS and their QoE. In one embodiment, the AM runs other emulated scenarios such as email sending/receive, video upload/download, etc., to estimate the QoS of the signals and QoE of the users. In one embodiment, the AM helps other applications such as MIMO cell bonding with the necessary information such as path A or path B of a 2×2 MIMO signal.

According to another aspect, a diagnostic application on an AM transitions the AM to a cellular diagnostic mode, leveraging eSIM technology to subscribe to different carriers of the provisioned cellular signals of a WDCS. In one embodiment, the on-board SIM can be physical hardware or in the software form.

According to another aspect, a system architecture is presented in which a WDCS is connected to the Internet and to the service providers via the Internet. In one embodiment, in addition to providing the service signals, the Internet providers also provide subscriptions as per the application requirements of the AMs. In one embodiment, the internet providers may access the applications within the AMs. In one embodiment, the AMs enable the remote units to connect to the internet directly without needing the head-end unit, and the applications on the AMs can connect directly to different servers using the provisioned signals rather than using the control signals provided by the head-end unit. In this manner, MAMs and MAUs can connect to the Internet either via a wired or wireless connection.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An application module (AM) for multi-carrier, diagnostic mode monitoring of signals within a wireless distributed communications system (WDCS), the AM comprising:
   a multi-carrier subscriber identity module (MSIM) comprising circuitry configured to implement a plurality of SIM instances, each SIM instance containing carrier specific data to enable the AM to register with a carrier to perform diagnostic mode monitoring of signals from the respective carrier;
   at least one communications interface configured to receive communications signals from a plurality of sectors in the WDCS, the communications signals comprising at least one of a downlink communications signal and an uplink communications signal; and
   at least one processor configured to execute at least one application layer application to analyze the at least one of the downlink communications signal and the uplink communications signal;
   wherein the AM is configured to communicate application-level information regarding the analyzed at least one of the downlink communications signal and the uplink communications signal to another system.

2. The AM of claim 1, wherein the AM operates in at least one of:
   a diagnostic mode, during which the AM is registered with a carrier; and
   a scanning mode, during which the AM is not registered with a carrier.

3. The AM of claim 2, wherein during operation in the diagnostic mode, the MSIM is connected or activated, and during operation in the scanning mode, the MSIM is disconnected or deactivated.

4. The AM of claim 1, wherein the circuitry configured to implement the plurality of SIM instances comprises logic to activate or deactivate at least one of the plurality of SIM instances.

5. The AM of claim 1, wherein at least one of the plurality of SIM instances comprises a hardware SIM instance.

6. The AM of claim 5, wherein the hardware SIM instance comprises a SIM card.

7. The AM of claim 5, wherein the hardware SIM instance comprises a hardware SIM card emulator.

8. The AM of claim 1, wherein at least one of the plurality of SIM instances comprises a virtual SIM instance.

9. The AM of claim 8, wherein the virtual SIM instance comprises a software SIM.

10. The AM of claim 8, wherein the virtual SIM instance comprises a software SIM card emulator.

11. The AM of claim 8, wherein the AM is configured to receive at least one virtual SIM instance over the at least one communications interface and to store the received at least one virtual SIM instance within the MSIM.

12. The AM of claim 11, wherein the AM is configured to receive the at least one virtual SIM instance from a virtual SIM subscription manager separate and distinct from the AM.

13. The AM of claim 8, wherein the AM is configured to upload at least one virtual SIM instance over the at least one communications interface.

14. The AM of claim 13, wherein the AM is configured to upload the at least one virtual SIM instance to a virtual SIM subscription manager separate and distinct from the AM.

15. The AM of claim 13, wherein the AM is further configured to deactivate a virtual SIM instance from the MSIM.

16. The AM of claim 1, wherein the at least one communications interface comprises a wireless communications interface.

17. The AM of claim 16, wherein the wireless communications interface comprises at least one of a cellular modem interface, a Bluetooth modem interface, or a Wireless Fidelity (WiFi) interface.

18. The AM of claim 1, wherein the at least one communications interface comprises a wired communications interface.

19. The AM of claim 1, wherein the AM is a component of a multiple-application module (MAM).

20. The AM of claim 19, wherein the MAM is a component of a radio interface module (RIM), an optical interface module (OIM), or a remote antenna unit (RAU).

21. The AM of claim 1, wherein the AM is a component of a multiple-application unit (MAU).

22. The AM of claim 1, further comprising an internal memory configured to store the application-level information.

23. The AM of claim 1, further configured to operate as a client device within the WDCS.

* * * * *